United States Patent
Smatloch et al.

(10) Patent No.: US 9,376,936 B2
(45) Date of Patent: Jun. 28, 2016

(54) EXHAUST GAS TURBOCHARGER HOUSING

(75) Inventors: Christian Smatloch, Paderborn (DE); Elmar Grussmann, Altenbeken (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 794 days.

(21) Appl. No.: 13/699,159

(22) PCT Filed: May 19, 2011

(86) PCT No.: PCT/DE2011/001086
§ 371 (c)(1),
(2), (4) Date: Nov. 20, 2012

(87) PCT Pub. No.: WO2011/144206
PCT Pub. Date: Nov. 24, 2011

(65) Prior Publication Data
US 2013/0064655 A1 Mar. 14, 2013

(30) Foreign Application Priority Data
May 21, 2010 (DE) .......................... 10 2010 022 218

(51) Int. Cl.
*F02C 6/12* (2006.01)
*F01D 9/02* (2006.01)
*F01D 25/24* (2006.01)

(52) U.S. Cl.
CPC ................ *F01D 25/24* (2013.01); *F01D 9/026* (2013.01); *F02C 6/12* (2013.01); *F05D 2220/40* (2013.01); *F05D 2240/55* (2013.01)

(58) Field of Classification Search
CPC ..... F01D 25/24; F01D 25/243; F01D 25/246; F01D 9/00; F01D 9/023; F01D 11/00; F01D 11/005; F04D 29/582; F04D 29/4206; F02C 6/12; F05D 2220/40; F05D 2240/55
See application file for complete search history.

(56) References Cited

U.S. PATENT DOCUMENTS

| 2,841,419 A | | 7/1958 | Jay | |
|---|---|---|---|---|
| 4,401,622 A | * | 8/1983 | Benn | C22C 19/056 420/448 |
| 7,074,009 B2 | * | 7/2006 | Allmang | F01D 9/026 415/177 |
| 7,198,459 B2 | * | 4/2007 | Grussmann | F01D 9/026 415/134 |

(Continued)

FOREIGN PATENT DOCUMENTS

| DE | 10 08 533 | 5/1957 |
|---|---|---|
| DE | 100 22 052 | 3/2001 |
| DE | 103 52 960 B4 | 6/2006 |
| EP | 0 744 537 | 11/1996 |
| EP | 0 918 140 | 5/1999 |
| EP | 1 357 278 | 10/2003 |

(Continued)

*Primary Examiner* — Richard Edgar
*Assistant Examiner* — Brian P Wolcott
(74) *Attorney, Agent, or Firm* — Henry M. Feiereisen LLC

(57) ABSTRACT

A turbine housing of an exhaust gas turbocharger, includes an outer housing in which an inner housing with a tubular nozzle and an outlet duct for connection to an exhaust gas system is arranged. The outlet duct is coupled with the tubular nozzle for movement relative to the nozzle via a seal ring. The seal ring is inwardly everted and pushed onto the nozzle and embraced by an inner-housing support ring, so that a fluid tight fit on the inner housing nozzle is ensured. The seal ring is further pushed onto the outlet duct and there also coupled onto the outlet duct with an outlet duct support ring in a fluid tight manner so that an especially durable connection is created. Both support rings are additionally coupled in a materially bonded manner with the seal ring and the outlet duct nozzle or with the inner housing.

11 Claims, 2 Drawing Sheets

(56) References Cited

U.S. PATENT DOCUMENTS

| | | | |
|---|---|---|---|
| 8,382,429 B2 * | 2/2013 | Grussmann | F01D 9/02 415/211.2 |
| 2005/0133012 A1 | 6/2005 | Grussmann et al. | |
| 2010/0098533 A1 | 4/2010 | Grussmann et al. | |

FOREIGN PATENT DOCUMENTS

| | | |
|---|---|---|
| EP | 1 531 238 | 5/2005 |
| EP | 2 180 163 | 4/2010 |
| JP | 2002 349275 | 12/2002 |
| JP | 2005-147139 A | 6/2005 |

* cited by examiner

EXHAUST GAS TURBOCHARGER HOUSING

CROSS-REFERENCES TO RELATED APPLICATIONS

This application is the U.S. National Stage of International Application No. PCT/DE2011/001086, filed May 21, 2011, which designated the United States and has been published as International Publication No. WO 2011/144206 A1 and which claims the priority of German Patent Application, Serial No. 10 2010 022 218.6, filed May 21, 2010, pursuant to 35 U.S.C. 119(a)-(d).

BACKGROUND OF THE INVENTION

The present invention relates to a turbine housing of an exhaust gas turbocharger.

Internal combustion engines, in particular those used in motor vehicles are increasingly charged by fluid kinetic machines in order to further increase performance and with this lower fuel consumption. Preferably, turbochargers are used as fluid kinetic machines. The turbocharger and in particular the turbocharger housing are adjusted very accurately to the performance characteristic of the respective engine.

In order for the turbocharger to operate with a high performance it is very important to ensure exact clearances between individual components of the turbocharger before, during and after the operation. In between the individual operating states, temperature differences of up to several 100° C. occur which result in different expansions in the different components and used materials and material thicknesses. In case of expansion, the clearances also change so that an undesired blowby may occur within the turbocharger. This causes a reduction of the performance of the turbocharger. Also, components may come into contact with each other due to different expansions. In a worst case, collisions of the components occur, which cause damage to or a total failure of the turbocharger.

SUMMARY OF THE INVENTION

Further, the weight reduction of all materials and components used in motor vehicle construction is very important. In this regard, a turbocharger, in particular a housing of a turbocharger constructed from sheet metal is sought to be produced particularly lightweight.

DE 100 22 052 A1 proposes the de-coupling of exhaust gas conducting components and to support or seal outer structures. While the exhaust gas conducting components of the turbocharger are exposed to high thermal stress, so that as to glow during operation, the thermal stress on the sealing outer structures is significantly smaller. However, the outer housing, in particular in the areas of the connection to the bearing housing of a turbocharger and also at the inlet sides of the relatively hot exhaust gas are also exposed to very high thermal and flow technical stresses.

The outer housing of a turbocharger generally consists of formed sheet metal shells which are usually welded together with bearing flanges using thermal joining. Also coupled to the bearing flanges is an inner housing of the exhaust gas turbocharger.

Usually, the inner housings rest against the bearing flanges or are additionally bonded to the bearing flanges. When the inner housing rests against the bearing flanges, an incomplete sealing and with this blowby may occur due to the different coefficients of thermal expansion. In case of a bonding coupling, the zone impacted by heat during the thermal joining process is geometrically and materially weakened by the thermal joining process. At this point, fatigue fractures or cracks may form in case of extreme stresses.

The object of the present invention is therefore to increase the tightness and the durability of an exhaust gas turbocharger so that the thermal stresses do not result in a premature failure of the components, and thermally based expansions are compensated by the construction of the exhaust gas turbocharger.

The previously mentioned object is solved by a turbine housing including an outer housing, in which an inner housing with a tubular nozzle and an outlet duct for connection to an exhaust gas system is arranged, wherein the outlet duct is coupled via a seal ring to the tubular nozzle for relative movement, characterized in that the seal ring is inwardly everted pushed onto the nozzle and an inner-housing support ring is provided, which embraces the seal ring with the nozzle at the site of coupling.

Advantageous embodiments of the present in invention are set forth in the dependent claims.

The turbine housing of an exhaust gas turbocharger according to the invention includes an outer housing in which an inner housing with a tubular nozzle and an outlet duct for connection to an exhaust gas system are arranged, wherein the outlet duct is coupled to the tubular nozzle via a sealing lip for movement relative to the nozzle. The seal ring is everted inward and pushed onto the nozzle, wherein an inner-housing support ring is provided which embraces the seal ring at the site of coupling with the nozzle.

According to the invention, the seal ring is arranged so that it connects the inner housing with the outlet duct and seals the internal space of the inner housing and the internal space of the outlet duct against the outer housing. Within the framework of the invention the seal ring can also be configured tubular. This results in particular in the advantage that a thermal expansion is compensated owing to the elastic deformation of the seal ring. At the same time, the seal ring enables a gas tight sealing of the internal space of the inner housing against the space which is enclosed by the outer housing and the inner housing. The everted embodiment according to the invention of the seal ring enables an elastic arrangement of the seal ring. A turbine housing according to the invention can be produced by a seal ring which is everted onto the nozzle or is already everted by a forming process, and has then been pushed onto the nozzle with the everted region.

In a further preferred embodiment, the inner-housing support ring, the seal ring and the nozzle are materially bonded to one another. A secure resting of the nozzle against the seal ring or the seal ring against the nozzle is realized by the everted configuration of the seal ring. In addition, the latter is reinforced by the inner-housing support ring, so that the inner-housing support ring can be considered a clamping ring which further clamps the site of coupling between the seal ring and the nozzle.

According to the invention, an additional material bonding can occur, in order to further increase the tightness especially with regard to the durability. A material bonding relates for example to an adhesive joint, a soldered joint or a welded joint. According to the invention, the material bonding is preferably established at the side which faces away from the exhaust gas, so that the joining seam is not exposed to the hot exhaust gas stream. This also has the advantage that the heat impact zone around the joining seam is not exposed to the hot exhaust gas stream. This increases the durability of the so produced joint within the turbine housing.

In a further preferred embodiment, the seal ring is pushed onto the outlet duct in the region of the site of connection between the seal ring and the outlet duct, and an outlet duct support ring is arranged so as to embrace the seal ring. This results in advantages for the coupling of the seal ring to the outlet duct analogous to the coupling of the seal ring with the nozzle. Within the context of the invention, it is also conceivable that the seal ring is evertedly pushed onto the outlet and in addition the gas tightness of the coupling between the outlet duct and the seal ring is increased by the outlet duct support ring especially with regard to the durability.

In a further preferred embodiment the outlet support ring, the outlet duct support ring, the outlet duct and the seal ring are materially bonded to one another. This results in advantages analogous to the ones relating to the coupling of the inner-housing support ring, the seal ring and the nozzle.

Preferably, the inner-housing support ring and/or the outlet duct support ring are widened in the direction of the inner housing. Especially with regard to the durability and the aspect of the use of thin walled material of the seal ring, this has the advantage that in the case of relative movements or relative displacements and with this movements of the seal ring, no sharp edges come into contact with the seal ring. The widening creates a relieve gap between the support ring and the seal ring which avoids the formation of cracks or thinning of material and with this increases the durability of the connection which was produced with the seal ring according to the invention. Leakages in the form of micro cracks or fatigue fractures within the seal ring are thus avoided according to the invention.

In the context of the invention, a widening of the support rings relates to a support ring with a flared end. This means the support ring has a constant diameter over a contact region in which the seal ring clamps with the outlet duct or the inner housing, which diameter then increases toward the widened end.

Preferably, an interference fit is formed in the sites of coupling of the seal ring with the outlet duct and/or the nozzle. An interference fit in the context of the invention is a press fit, in which the inner diameter of the seal ring at the coupling site is principally smaller than the outer diameter of the outlet duct or of the nozzle at the site of coupling. Thus, a press fit principally occurs between the seal ring and the outlet duct or nozzle. The thus produced connection is particularly advantageously adapted with regard to a tight fit and a fluid tightness.

In a further particularly preferred embodiment an interference fit is formed in the coupling sites of the seal ring with the inner-housing support ring and/or the outlet duct support ring. The support rings thus increase the strength factor with which the seal ring sits on the nozzle or the outlet duct. Especially with regard to very thin walled seal rings, an especially strong and gas tight fit is realized by the support rings in the coupling region at simultaneous high flexibility of the seal ring with regard to radial and axial movability.

Preferably, the inner housing is movable radial and axially relative to the outlet duct with regard to a rotation axis of the turbine. According to the invention, this results in the advantage that no impairment of the inner housing occurs in radial or axial direction by the seal ring. A grinding of the turbine wheel during operation of the exhaust gas turbocharger is thus avoided. Furthermore, this results in the advantage according to the invention that manufacturing tolerances occurring during production of the individual components are compensated.

In a further preferred embodiment, the seal ring has a wall thickness of less than 0.3 mm, preferably less than 0.2 mm. This results in the advantage that the overall system, especially with regard to the cold start process of an internal combustion engine, decreases the emission values. Very thin thicknesses of component walls allow ensuring that only a small heat influx into the components occurs and thus an improved starting behavior of the catalytic converter is ensured. The catalytic converter or the entire exhaust gas after treatment unit which is located downstream of the exhaust gas turbocharger, can thus faster be brought to operating temperature and which thus lowers the emission values of the internal combustion engine. In the context of the invention, components with wall thicknesses of less than 0.1 mm can thus be used in the entire system of the exhaust gas turbocharger.

According to the invention, the free choice of materials allows adapting the seal ring to a broad spectrum of use. For example, it is conceivable to use metallic or light metallic materials. Also fiber reinforced materials or GFK/CFK materials or materials with ceramic parts are conceivable. Preferably, a nickel based alloy of the seal ring is used in order to produce the seal ring with very small housing wall thicknesses.

In a further preferred embodiment, the seal ring is configured double walled. This means that the seal ring is formed by two wall layers. Between the wall layers an air space is formed which leads to further insulation. In the context of the invention, it is also conceivable to use a seal ring which is configured as hybrid component. This means that both wall layers are made of different materials as previously mentioned.

BRIEF DESCRIPTION OF THE DRAWING

Further advantages, features, properties and aspects of the present invention result from the following description. Preferred embodiments are shown in the schematic drawings. These serve for a better understanding of the invention. It is shown in.

In the description, the same reference signs are used for the same or similar components, even when a repeated description is not given for reasons of simplicity.

DETAILED DESCRIPTION OF PREFERRED EMBODIMENTS

Figure 1:
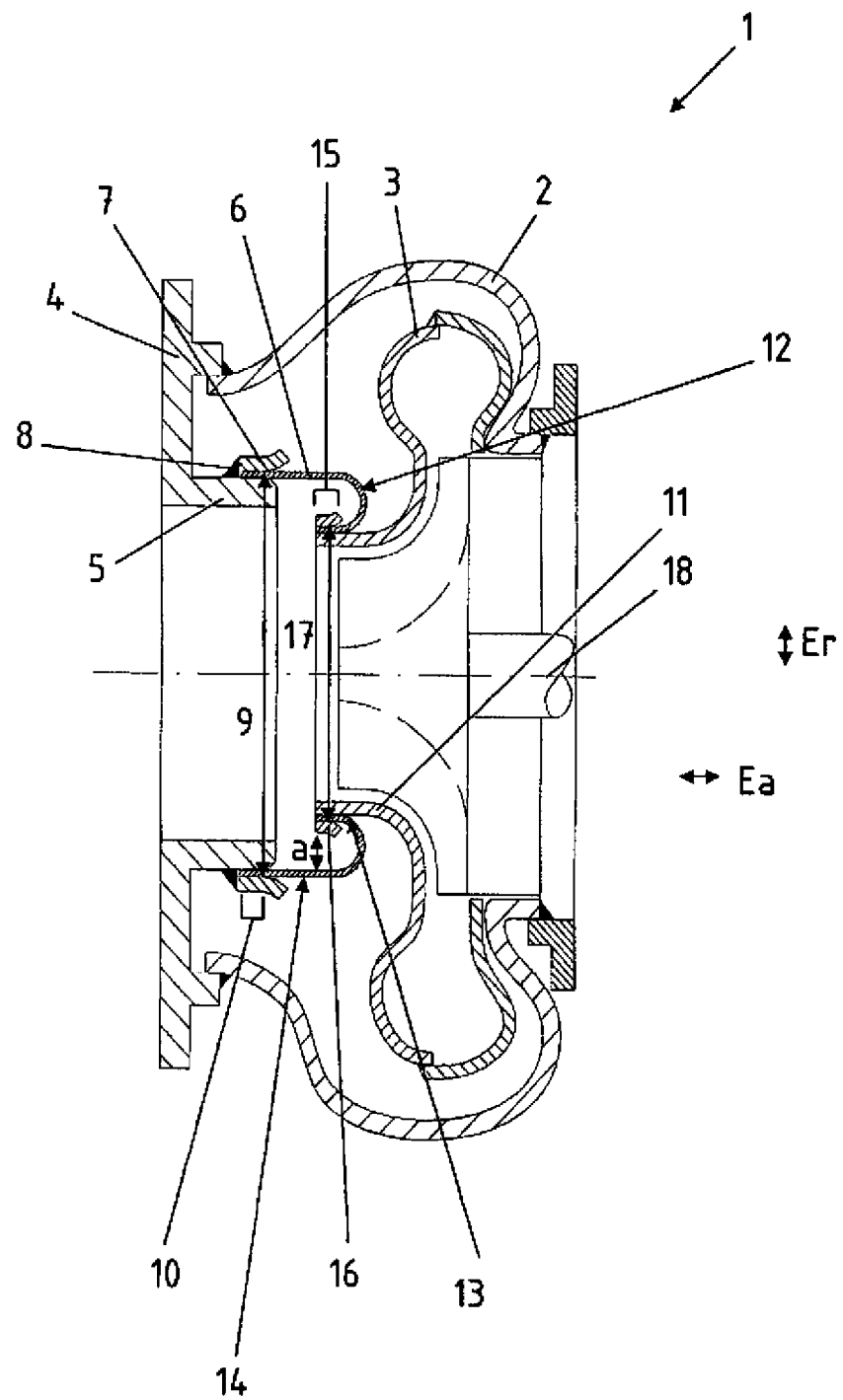
FIG. 1 a side view through a turbine housing according to the invention.

FIG. 1 shows a turbine housing 1 according to the invention of an exhaust gas turbocharger. The turbine housing 1 is formed by an outer housing 2 and an inner housing 3. Arranged on the inner housing 3 or the outer housing 2 is an outlet flange 4 with an outlet duct 5. The outlet duct 5 points in the direction of the inner housing 3. The outlet flange 4 serves for coupling with the here not further shown exhaust gas system which is located downstream of the turbine housing 1. The outlet duct 5 is connected to the inner housing 3 via a seal ring 6. The seal ring 6 is pushed over the outlet duct 5. In addition, the coupling site of seal ring 6 and outlet duct 5 has an outlet duct support ring 7 which embraces the seal ring 6. For a better coupling, the seal ring 6, the outlet duct support ring 7 and the outlet duct 5 are materially bonded to each other via a joint seam 8. The diameter 9 of the outlet duct support ring 7 widens in the direction of the inner housing 3. Between the seal ring 6 and the outlet duct 5 and the outlet duct support ring 7, a coupling region 10 is formed in which the components each contact one another in a planar manner.

On its other side, the seal ring 6 is arranged so as to contact a nozzle 11 of the inner housing 3. Starting from the region of coupling 10 with the outlet duct 5, the seal ring 6 has an everted course. At an eversion 12, the seal ring 6 is deformed with an angle of about 180° so that its section 13 which contacts the nozzle 11 extends at a distance a to a base body region 14 of the seal ring 6. In a region of contact 15 of the seal ring 6 with the nozzle 11, the seal ring 6 also comes into substantially flat contact.

In the contact region 15, the seal ring 6 is further embraced by an inner-housing support ring 16. The inner-housing support ring 16 widens its inner diameter 17 in the direction toward the inner housing 3. In the contact region 15 the inner-housing support ring 16 is configured so as to substantially flatly contact the seal ring 6. The seal ring 6 has in cross section a substantially J-shaped course.

With regard to a rotation axis 18 of a turbine wheel, an elasticity Ea in the direction of the rotation axis 18 of the turbine wheel and an elasticity Er radial to the rotation axis 18 of the turbine wheel is enabled by the seal ring 6. The inner housing 3 can expand thermally in radial as well as in axial direction, without the inner housing 3 contacting the outlet flange 4.

Figure 2:
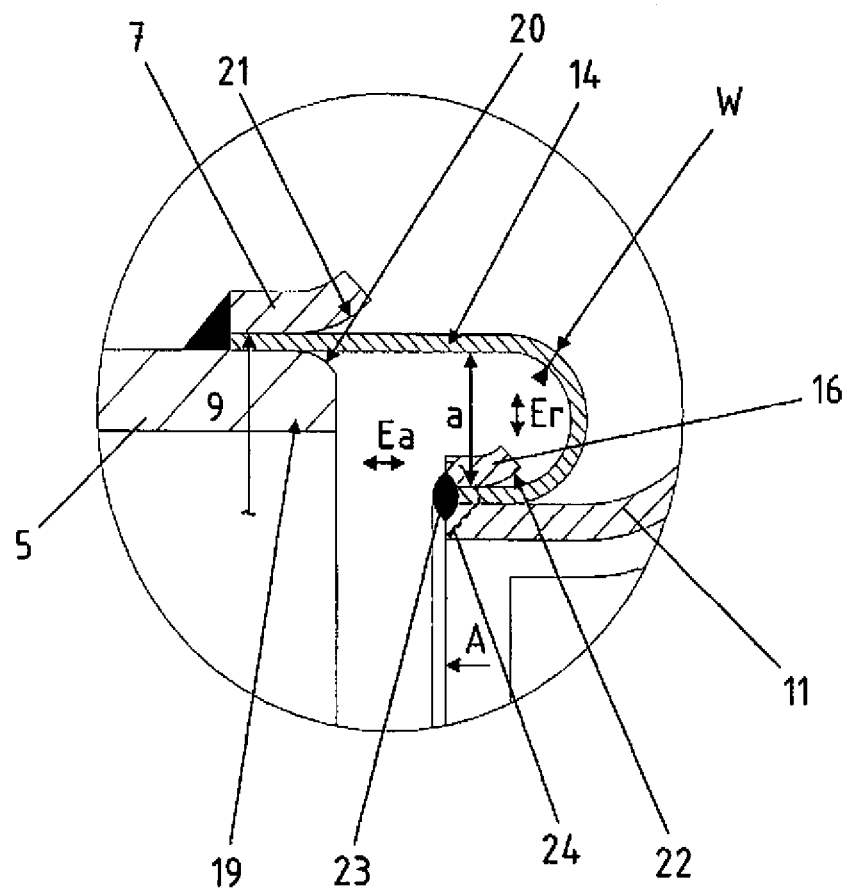
FIG. 2 a detail view of a connection according to the invention of an outlet duct with a nozzle via a seal ring.

FIG. 2 shows a detail view of the coupling according to the invention of outlet duct 5 and nozzle 11. The outlet duct 5 has a rounding 20 in its end region 19. This also ensures that a shifting of the seal ring 6 does not have an abrasive or crack forming effect in connection with the end region 19 of the outlet duct 5. The durability of the coupling according to the invention is thus increased.

A rounding 21 of the outlet duct support ring 7 is also formed. This rounding 21 results from the widening inner diameter 17 of the outlet duct support ring 7. The inner-housing support ring 16 also has a rounding 22, which is formed by the widened inner diameter 9 of the inner-housing support ring 16. For a better fit, especially with regard to durability, the inner-housing support ring 16, the seal ring 6 and the nozzle 11 are coupled with an additional joining seam 23 in a material bonded manner. The joining seam 23 sits outside of the direction of flow of the exhaust gas A.

As a consequence, the joining seam 23 and the heat impact zone 24 surrounding the joining seam 23 are not exposed to the exhaust gas stream which contains hot and highly corrosive components. The distance a enables an elastic movement in radial direction and the base body region 14 of the seal ring 6 an elastic movement in axial direction, respectively with regard to the here not further shown turbine rotation axis. The seal ring 6 has preferably a wall thickness W over its entire extent.

REFERENCE SIGNS

1—turbine housing
2—outer housing
3—inner housing
4—outlet flange
5—outlet duct
6—seal ring
7—outlet duct support ring
8—joining seam to 7
9—inner diameter to 7
10—coupling region
11—nozzle
12—eversion
13—section to 6 at 11
14—base body region of 6
15—contact region
16—inner-housing support ring
17—inner diameter to 16
18—turbine wheel rotation axis
19—end region to 5
20—rounding to 5
21—rounding to 19
22—rounding to 16
23—joining seam
24—heat impact zone
A—distance
Ea—elasticity axial
Er—elasticity radial
A—direction of flow of exhaust gas
W—wall thickness

The invention claimed is:

1. A turbine housing of an exhaust gas turbocharger, comprising:
    an outer housing;
    an inner housing arranged in the outer housing and including a tubular nozzle and an outlet duct for connection to an exhaust gas system;
    a seal ring pushed onto the nozzle in an inwardly everted manner, said seal ring coupling the outlet duct to the tubular nozzle for movement of the outlet duct relative to the tubular nozzle; and
    an inner-housing support ring which embraces the seal ring at a site of coupling of the outlet duct to the tubular nozzle, wherein the inner-housing support ring and/or outlet duct support ring are widened in the direction of the inner housing.

2. The turbine housing of claim 1, wherein the inner-housing support ring, the seal ring and the nozzle are coupled to one another in a materially bonded manner.

3. The turbine housing of claim 1, further comprising an outlet duct support ring, wherein the seal ring is pushed onto the outlet duct at a site of coupling of the seal ring with the outlet duct, and wherein the outlet duct support ring embraces the seal ring.

4. The turbine housing of claim 3, wherein the outlet duct support ring, the outlet duct and the seal ring are materially bonded together.

5. The turbine housing of claim 3, wherein an interference fit is formed at the site of coupling of the seal ring with the outlet duct and/or the nozzle.

6. The turbine housing of claim 1, wherein an interference fit is formed in the sites of coupling of the seal ring with the inner-housing support ring and/or the outlet duct support ring.

7. The turbine housing of claim 1, wherein the inner housing is supported for radial and axial movement relative to the outlet duct with regard to a turbine-wheel rotation axis.

8. The turbine housing claim 1, wherein the seal ring has a wall thickness (W) of less than 0.3 mm.

9. The turbine housing claim 1, wherein the seal ring has a wall thickness of less than 0.2 mm.

10. The turbine housing of claim 1, wherein the seal ring is made of a nickel based alloy.

11. The turbine housing of claim 1, wherein the seal ring is configured double walled.

\* \* \* \* \*